United States Patent
Navarini et al.

[11] Patent Number: 6,056,141
[45] Date of Patent: May 2, 2000

[54] RECLOSABLE PACKING SYSTEM

[75] Inventors: Franco Navarini; Armando Molinari, both of Piacenza, Italy

[73] Assignee: SAFTA S.p.A., Piacenza, Italy

[21] Appl. No.: 09/215,896

[22] Filed: Dec. 18, 1998

[30] Foreign Application Priority Data

Dec. 18, 1997 [IT] Italy .................................... 97A02799

[51] Int. Cl.$^7$ ................................................. B65D 17/34
[52] U.S. Cl. .................. 220/269; 220/359.2; 220/359.3; 220/359.4; 428/35.8; 428/35.9; 428/134; 428/138
[58] Field of Search .............................. 220/359.2, 359.3, 220/359.4, 266, 268, 269, 276; 428/35.7, 35.8, 35.9, 131, 134, 137, 138

[56] References Cited

U.S. PATENT DOCUMENTS

| | | | |
|---|---|---|---|
| 4,280,653 | 7/1981 | Elias | 220/359.2 X |
| 4,913,307 | 4/1990 | Takata et al. | 220/276 |
| 5,002,223 | 3/1991 | Bolte et al. | 220/276 X |
| 5,160,767 | 11/1992 | Genske et al. | 428/35.9 |
| 5,281,453 | 1/1994 | Yamada et al. | 428/35.7 |
| 5,518,790 | 5/1996 | Huber et al. | 428/35.9 X |
| 5,709,310 | 1/1998 | Kretz | 220/270 |
| 5,851,333 | 12/1998 | Fagnant et al. | 220/359.3 X |
| 5,857,582 | 1/1999 | Schultz | 220/269 |
| 5,873,483 | 2/1999 | Gortz et al. | 220/269 |
| 5,919,547 | 7/1999 | Kocher et al. | 428/138 |
| 5,976,655 | 11/1999 | Sykes | 220/359.3 X |

FOREIGN PATENT DOCUMENTS 661 154 B1  12/1994  European Pat. Off. .

*Primary Examiner*—Stephen K. Cronin
*Attorney, Agent, or Firm*—Laff, Whitesel & Saret, Ltd.

[57] ABSTRACT

The invention concerns flexible, composite, multilayer sheets which act as means to open and close appropriately shaped containers (f.i. trays) of products consumable also in more successive doses and which are characterized by an opening edge, a device to stop said opening, a tamper evident device and a protection layer. Said multilayer sheets include at least:

a first superior outer layer consisting of at least a film acting as support of the printing and of a press-sensitive adhesive;

a second inferior inner layer consisting of at least a thermosealant film and characterized by die-cut zones having the function to detemine the access mouth shape and to create an invitation to the eased opening; and an intermediate layer consisting of a press-sensitive adhesive.

18 Claims, 4 Drawing Sheets

U.S. Patent May 2, 2000 Sheet 1 of 4 6,056,141

RECLOSABLE PACKING SYSTEM

BACKGROUND OF THE INVENTION

The present invention concerns reclosable packaging systems substantially comprising a container body of commercial products in doses superior to the monodose, and a composite sheet to form a lid easy to open and repeatedly reclosable. In a preferred embodiment of the invention this system is characterized in that it comprises at least:—an opening edge (7);—a device to stop said opening (10);—a layer (5) of protection against the possible aggressions of the content;—a handle or grip border (8);—a device to signal tamperings (12).

A system of this kind is substantially described in the Applicant's European Patent N° 0661154 in which however several structural and technological aspects are not faced. For instance the hypothesises of a tamper evident and of an easy open are mentioned but no optimal embodiments thereof are described to obtain and impart these additional characteristics to the patented system. Moreover, in the continuation of its research works Applicant had to meet the necessity to protect the content of the tray also against possible contaminations by the components of the reclosable cover forming laminate.

It has then be ascertained that an undesirable inter-action between said content product and the lid components can occur in the sense that some particular contents may develop aggressive substances which damage or at least spoil the laminate performances, in particular can weaken the inter-layer adhesion acting on the integrity of the press-sensitive adhesive. Further from the first experiences it has been possible to ascertain the necessity to have a specific means for the "ad hoc" handling of the container, in particular to easy the catching and the separation of the outer upper layer (2) from the internal layer (3), as well as to handle in the best way the packaging both in the opening phase as in the phase to extract the contained product and in the last but not least phase of reclosure or re-seal.

The first object of the present invention is to provide a more complete and specific system to impart to said patented packaging additional structural characteristics. Moreover an other object is to maintain with more advantageous measures and means some of the characteristics already present in the patented packaging but obtained in an not-optimal and/or undefined way. These and other objects are reached with this last generation packaging having the features recited in the appended claims which are considered herewith incorporated.

It is meantime convenient to premise that the packaging technology is passing progressively from the phase in which the sole scope of the packaging is the protection and conservation of the packed product to the phase in which the packaging becomes a means utilized by the transformation industry to communicate to the final user the characteristic features of the packed product. As a conseguence of this always more important role of the packaging the relevant industry had to and is succeeding to create more and more innovations by putting on the market continuous improvements of the packaging with the scope to increase the level of the service offered to the consumer.

On the line of what has been previously happening with the rigid (unflexible) packagings (glass, metall, plastics), also in the field of the flexible packaging the concept and need of the easied openings and of the reclosures are now becoming popular. Thus also in the flexible packaging the tendency is that of transforming the mono-dose into pluri-dose packaging, at a parity of sealing and airtight, closure characteristis.

The reasons of the evolution are to:

improve the services to the consumer by offering him the possibility of consuming the packed product in several times;

improve the ratio packaging cost/packed product thanks to the possibility of increasing the packed product quantity;

improve the environmental impact of the packaging as again a consequence of the changed ratio packaging/contained product.

One of the objects of the present invention is to provide the flexible packaging world with an innovative system of easied reclosability and openability prevailingly offered to the packagings in form of trays.

The characteristics of the reclosable packaging system according to the invention are recited in the following claims which are considered herewith incorporated.

The various aspects and advantages of the invention will better appear from the description of the preferred embodiments shown in the accompanying drawings in which.

Figure 1:
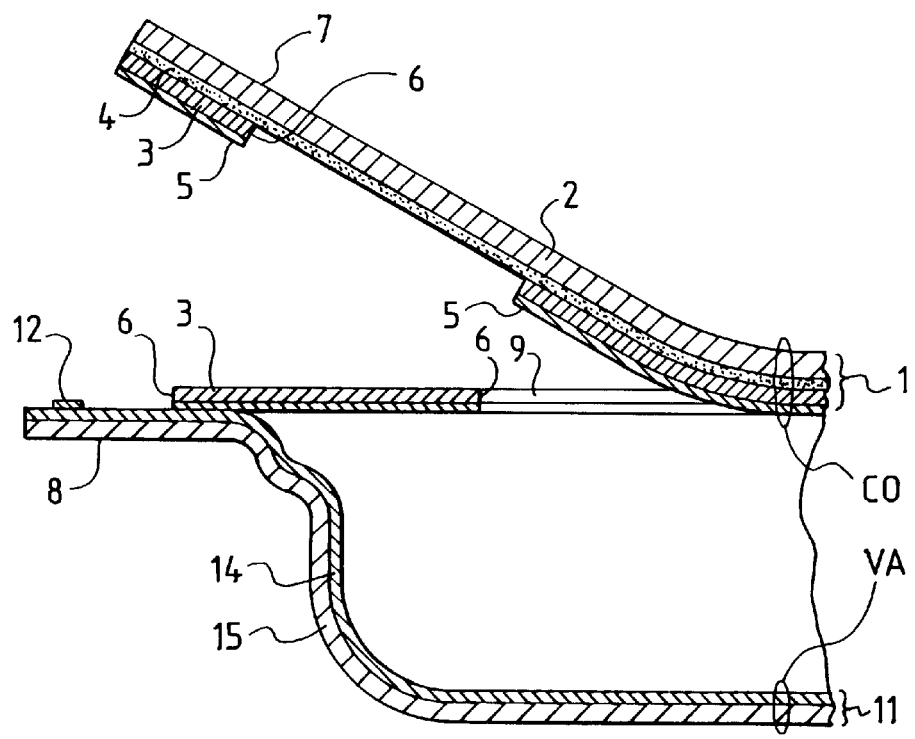
FIG. 1 is a partially cross-sectioned view of a basic packaging substantially according to the above mentioned European Patent N° 0661154 comprising however some important characteristics according to the present invention.
Figure 2:
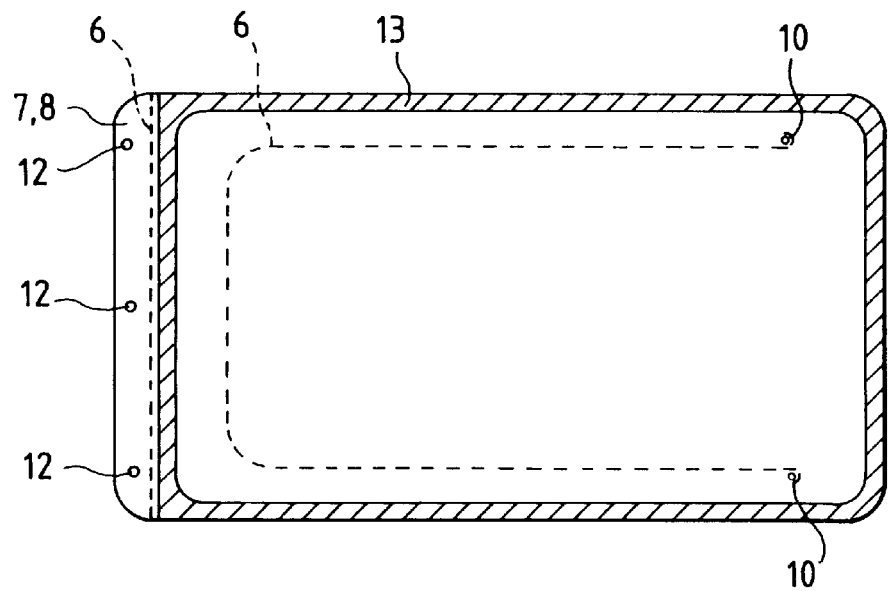
FIG. 2 is a top view of the cross-sectioned package showing the most important feature of the lid.
Figure 3:
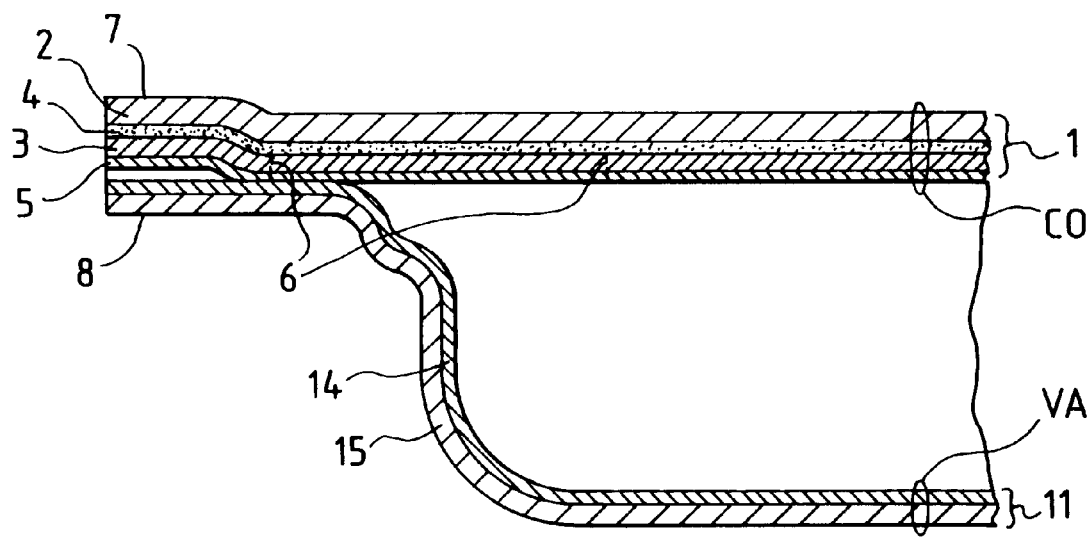
FIG. 3 is a cross-section view similar to FIG. 1 but with a closed lid.

In FIG. 1 the multilayer laminate of the reclosure lid CO of the container (f.i. tray) VA of the not-shown commercial product to be protected is indicated by the reference 1. Said laminate 1 comprises an external top layer 2 (also and preferably a multilayer, see FIGS. 5a, 5b, 5c) which has the function to support the "repositionable" adhesive 4 as well as the package personalizing printing.

Figure 4:
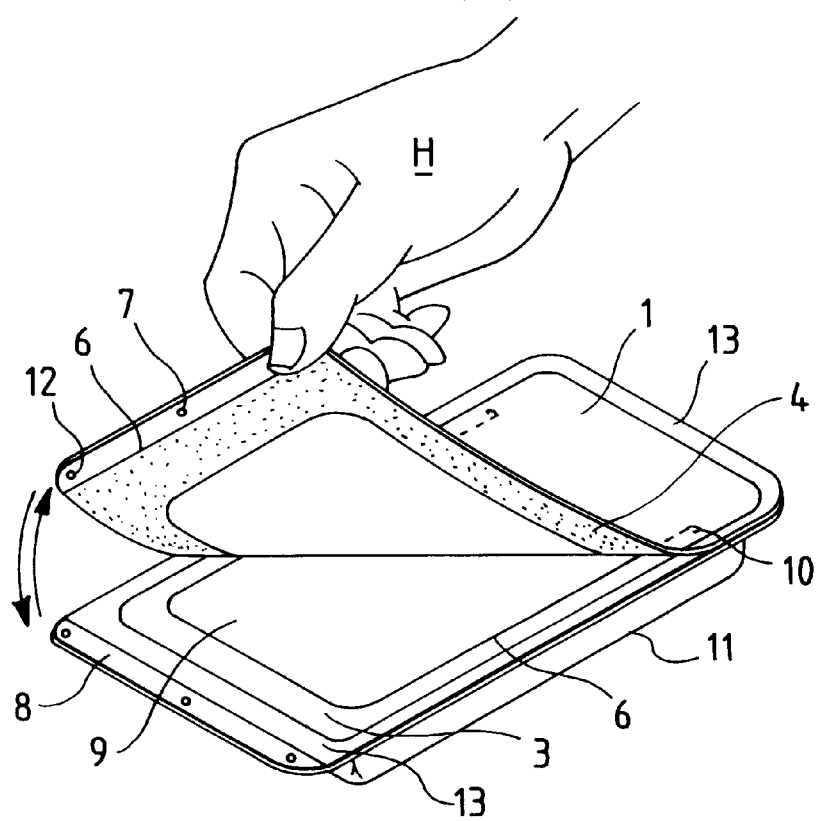
FIG. 4 is a perspective view of a package with a lid partially opened.
Figure 5A:
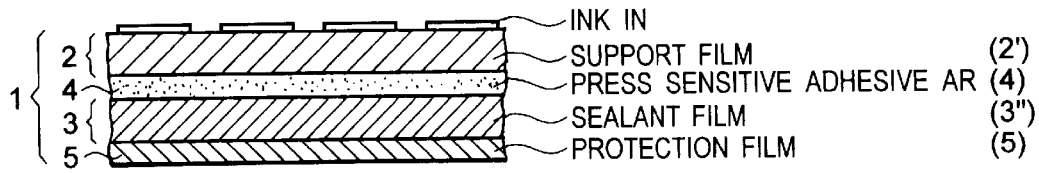
FIGS. 5a, 5b and 5c represent some of the possible compositions of the laminate of the lid.
Figure 5B:
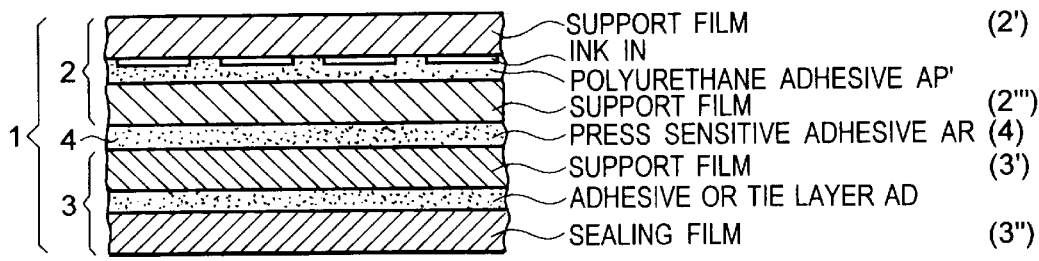
Figure 5C:
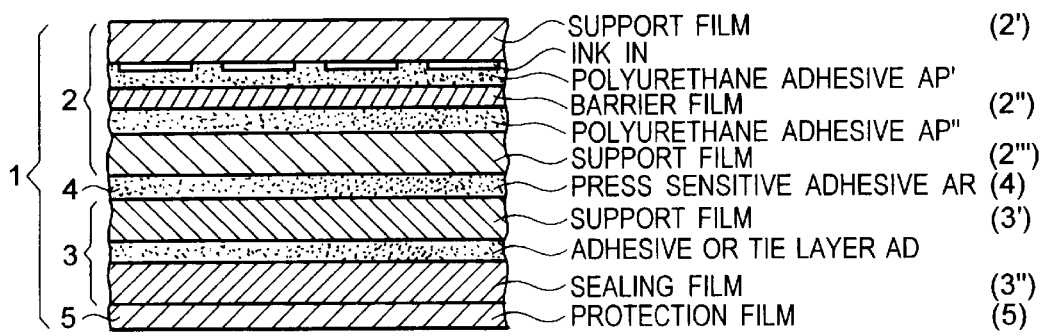
Figure 5D:
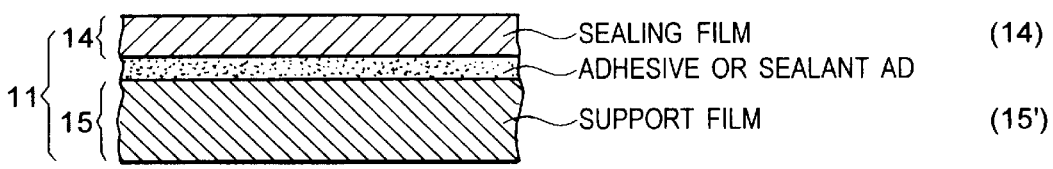
FIGS. 5d and 5e represent some of the possible compositions of the laminate of the container (tray)
Figure 5E:
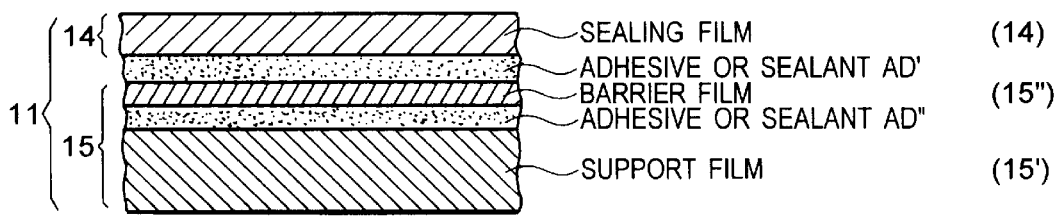

As it can be better seen from FIG. 5c, the layer 2 can also and preferably comprise a gas barrier layer 2". Layer 3 indicates the laminate inner layer which can, on its turn, consist of one or more thermoplastic films such as those indicated with 3' and 3" in the FIGS. 5a, 5b and 5c. Said layer 3 is die-cut (die-cutting 6—6 in FIGS. 1–4). According to an advantageous feature of the invention laminate 1 can, preferably, comprise a protective film 5, as indicated in the FIGS. 5a and 5c. The main characteristics of this system as applied to the packaging of containers like trays, and to the relevant lids are to be seen in the realization of:

1) A lid multilayer laminate 1 with the lower die-cut layer 3 substantially according to said Patent EP N° 661154. The die-cuttings with form and size adeguate to the type of tray to be sealed and to the packed products, serve to create:

a) a particular and new opening edge 7 which allows an easy grip of the laminate during package opening and reclosing phases. It is obtained through the die-cutting 6 of the lower layer of the lid laminate and the repositioning of same die-cutting in correspondence of the head welding.

b) An access mouth (9) which conventionally allows the access and extraction of the packed product. It is obtained through the shaped die-cutting 6 (having the desired form and size) of the lower layer of the lid laminate. Generally the shape size and position of the access mouth are proportioned to the packed product type and to the extraction exigencies.

c) According to an other feature of the invention, an additional new device to stop the opening 10, which has the task to block the separation of the upper layer from the lower layer of the laminate in the desired position. It is obtained by conventionally shaping the die-cut end 6 indicated as access mouth 9 (f.i. FIG. 4).

d) According to a further feature of the invention, a protection film 5 which is placed on the inner part of the multilayer laminate lower layer. It has generally a thin thickness, not above 40, preferably from 10 to 30 microns and is capable to break in correspondence of the die-cutting outline 6. Typically and advantageously, said film has mainly the task to protect the die-cut zone against possible attacks from the packed product and to avoid the possible migration of undesired substances towards the package interior.

2) The container, f. i. in form of a shaped tray, is conventionally made of plastic material. It is thermoformed on FFS (form-fill-seal) packaging lines or is preformed. It is typically characterized by:

e) grip edge 8 which is obtained by shaping the tray in such a way to allow an easy catch of same tray during the opening and reclosing operation.

f) Reclosure for several times is obtained through the overlapping and successive light pressure of the upper layer 2-4 on the lower layer 3. The catching (gripping) action of the press-sensitive adhesive 4 placed between the two layers 2–3 realizes a perfect reclosure of the package.

g) According to an other feature of the invention, the tamper evident device which clearly indicates the possible tampering of the package is now positioned in correspondence of the lifting border 8 and is obtained by means of small thermo-weldings 12 (see FIGS. 1, 2, 4) carried out at the same time of the sealing weldings 12, have generally a circular form with a diameter of 3–5 mm. and their number varies according to the tray size. The tamper evident is thus no more obtained with the aid of adhesive points but, advantageously, with the aid of said small thermo-weldings 12.

4) The characteristic of the system easy employement during the preparation phase of the finished packages by the user of the laminates (generally of the food industry).

h) Even if a laminate according to the invention comprises additional functional organs, it is still possible to obtain an advantageous complete insertion within said multilayer of the various above mentioned devices (access mouth 9, opening stop 10 etc.) in such a manner that the new reels of this laminate 1 be completely similar to the conventional ones.

i) No addition of working parts and/or substantial modification of the conventionally utilized packaging lines.

l) No particular regulation or control of the machinery conditions (welding temperature, packaging speed) normally utilized for the conventional laminate packaging.

Composition of the multilayer laminate 1.

5) The outer layer 2 (having the function of support of the repositionable adhesive 4 and of the possible printing) is generally constituted of one or more films of plastics, paper or metal, with characteristics of protection, barrier, printing and appearance so to be adeguate and adapted to the type of package and/or packed product as for instance shown in detail in the FIGS. 5a, 5b and 5c.

6) The inner layer 3 of laminate 1 having the function of a thermosealable film, is submitted to die-cutting operations 6 to obtain:

an invitation to the easy-open through a primer of the separation between the support upper layer 2 and the inner layer 3;

product access mouth 9 having shape and size adequate to said packed product;

opening block 10 positioned at the end of the access mouth 9.

Said layer 3 is generally costituted of a plastic film or a generally plastic film combination as shown in the FIGS. 5a, 5b and 5c.

7) The intermediate layer 4 consists of repositionable adhesive AR having a particular capacity to catch the support outer layer 2 and the inner layer 3. This press-sensitive adhesive, preferably of acrylic nature, is so formulated that its catching capacity remain unaltered even after repeated detachements of the superior layer 2 from the inferior layer 3. During the opening phase the adhesive layer 4 remains positioned on the upper layer 2 while detaching the lower layer 3.

8) As anticipated and according to a feature of the invention, the laminate comprises also a protection thin film 5, which must in particular cover the hollow-punched zones 6, and has properties of thermosealability compatible with the thermosealant layer of the tray 14. Preferably said film is constituted of polyolefin resins and has a thickness not higher than 40, preferably from 10 to 30 microns.

Bottom multilayer laminate 11

9) The container in particular the tray now provided with a lifting edge can be preformed or be thermoformed on the FFS packaging lines normally used for the tray sealing. It consists of an inner layer having thermosealing functions 14, compatible with thermosealant films 3–5 (also protective) of the above described lid multilayer laminate 1. It is formed of polyolefin resins, for instance PE or PP. Internally to said film 14 a barrier layer can be inserted (see FIG. 5c) if it is necessary for the packed product conservation. Generally it is composed of resins EVOH, PVDC, PAN etc. and is applied with the aid of lamination or coextrusion technologies. There is finally an outer thermoformable layer 15 which shows particular characteristics of rigidity, thermoformability and protection, adeguate to the type of the product to be packed and to the type of package to be manufactured. Conventionally layer 15 can be obtained again with the aid of said lamination or coextrusion technologies and is generally formed of sheets of PET, PVC, PP, PS, OPS, EPP (expanded polypropylene) of variable thickness preferably from a minimum of 150 to a maximum of 800 microns.

Functional features

10) The use by the final consumer of the package according to the invention takes obviously place starting from the operations of initial opening-extraction of the packed product-reclosure-successive reopening etc.

In details the operations take place in the following order: the package easy-opening is carried out by catching with one hand H (FIG. 4) the opening edge 7 and with the other hand (not shown) the catching edge of the tray 8 according to the invention, by pulling upwards said opening border so to start the separation (detachement) of the upper layer 2-4 from the lower layer 3 of the lid laminate 1. The layer separation causes the breaking of the small weldings 12 which have the function of tamper evident element and which according to the invention have proved to be particularly advantageous and innovative. By continuing the operation the access mouth 9 opens and this opening prosecutes until the meeting with the (also innovative and additional) opening stop device 10. Moreover the layer separation causes the breaking of the protective film 5 according to the invention, in correspondence of the die-cutting outline 6. Once the package is opened, the packed product can be taken out through the access opening 9, which has been uncovered during the partial detachement of the support layer 2-4 from the die-cut inner layer 3. The package hermetic reclosure takes place with the repositioning of the upper inner layer 3 caused by a light pressure capable of making perfectly adhered these two layers through the repositionable adhesive 4.

The repeativity of the above mentioned operations consent to have access several times to the product contained in the package till its complete consumption. The characteristics of the package according to the invention are such to allow its use even after said full consumption of the first packed product.

Examples of a detailed structure of the lid multilayer laminate 1 in its complete and relatively complexe form are shown in the figures 5a, 5b, 5c in which the laminate main components are indicated with the basic numeral references already used in the preceding figures. As emblematic example FIG. 5c will be described since it is the most complete and complexe embodiments. The outer layer 2 is composed of:

an outer support film (2') thermoresistant and printable, preferably in PET, OPA, OPP, paper etc.;—a printing ink IN of various colours (from one to nine) preferably of vinyl-or nitrocellulose base:—a two components polyurethanic adhesive AP;—a barrier film (2") for the content maximal protection f.i. consisting of EVOH, PVDC, alluminum, or coated with metal, oxides, PVDC, etc;—a two-components polyurethane adhesive AP;—a support film (2''') for the repositionable adhesive 4 having a composition similar or different from that of the outer layer. The intermediate layer 4 is constituted of the repositionable adhesive AR having the function to keep united the layers 2 and 3 and to allow the package repeated reclosures; said adhesive AR according to the invention is preferably of acrylic base.

The inner layer 3 comprises:—a support film (3') to impart stiffness having a composition similar to that of fims (2') and (2''');—a two component PU adhesive;—a sealing film (3") compatible with layer 5 and bottom 14, preferably of polyolefinic nature (f.i. PE, EVA, etc.). The protecting layer 5 consists of a polyolefinic film (f.i. PE, EVA, EAA etc.) of thin thickness (below 40 microns) and has the function to protect the die-cut zone and be compatible with (3") and 14.

Figure 6:
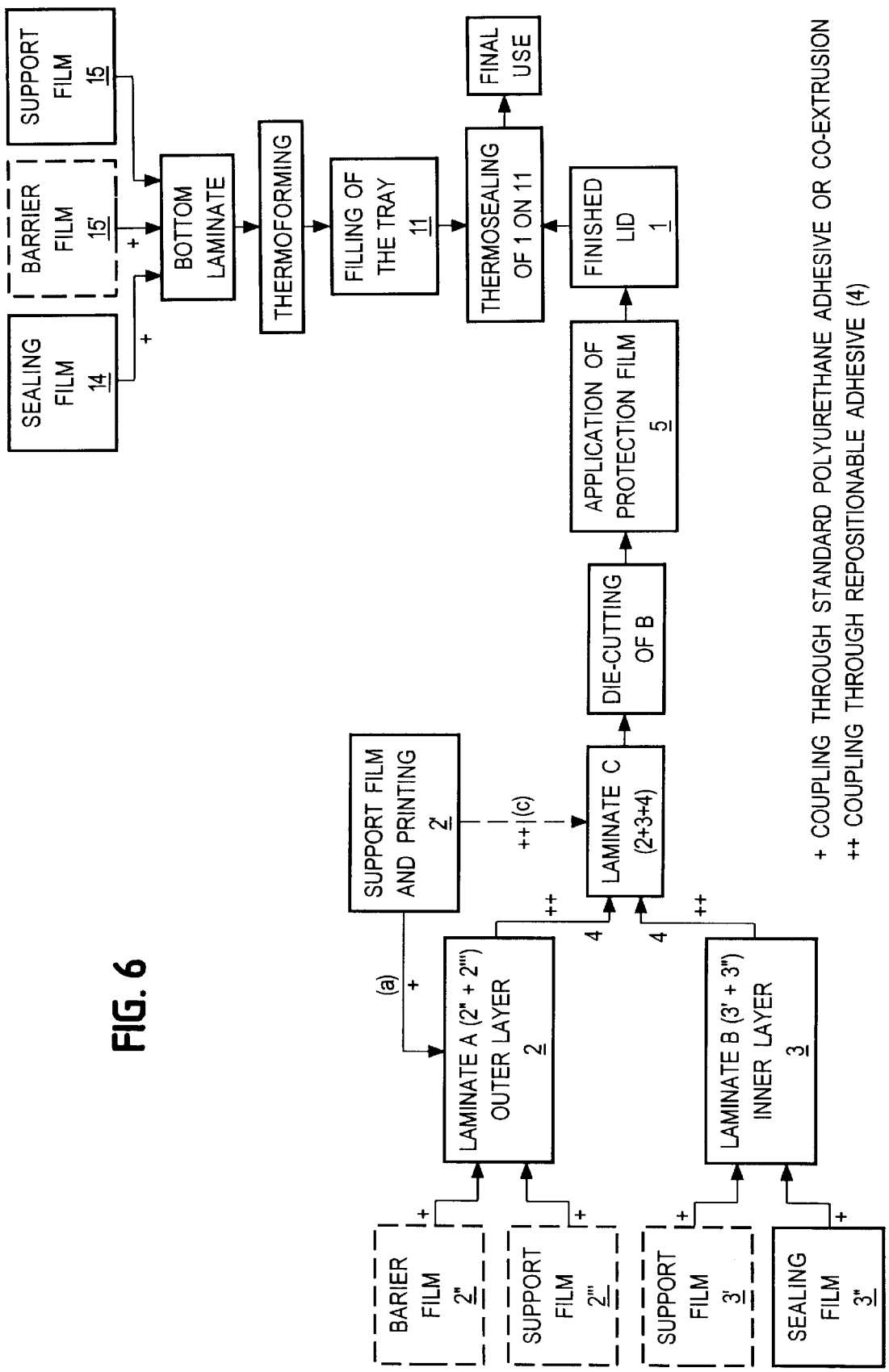
FIG. 6 ia s block diagram of the possible embodiments of the process to manufacture a finished package according to the invention.

In FIG. 6 is shown a block-diagram of a complete, very flexible and thus advantageous process comprising the main steps to obtain the finish package according to the invention. The manufacture of the complex laminate 1 of the package lid 1 (indicated also as CO) takes place through a series of operations articulated as follows:

the support film 2' is printed and coupled (on line with the printing- or in a successive-phase) with the barrier film 2" (if present) and/or with the support film 2''' or with the combination of the two films 2"+2''' i.e. the two layer laminate A, in the scheme direction (a), or directly with the combination of the two-layer laminate A and B, i.e. the laminate C, in the direction (c);

the sealing film 3''' is coupled with the support film 3' (if present) to form the two-layer laminate B;

said laminates A and B are bonded to each other with the aid of the special repositionable adhesive 4, to form the laminate C already comprising the support film 2', if operating in the direction (a) or to be coupled with said 2' in a successive step, if operating in direction (c);

laminate C is taken to the partial die-cutting phase consisting in the incision (or cut) of the sole layer 3 i. e. the laminate B, in the considered zones and forms;

the protection film 5 is finally added to C by extrusion-coating or lamination to protect the die-cut zone of B and to act as further sealing layer in addition to film 3'''.

With this phase the lid structure is completed which has the main function to seal the package and to render easy and safe the opening and reclosing operations.

The manufacture of the package bottom container 11, generally a tray, takes place through various phases, some of which are carried out on (or off) line with the filling and final sealing. Synthetizing the main phases are:

the sealing film 14, compatible with films 3" and 5 of lid 1 is coupled with the barrier film, if present, through lamination or coextrusion, and contemporaneously (or successively) is coupled or coextruded with support film 15;

the so prepared bottom laminate 11 is taken to the forming phase carried out separately or (more frequently) in line with the packaging, i.e. together with the product loading and lid welding (or sealing) by means of a thermo-forming machine normally utilized for the preparation of packages.

The finished package is then sent to the distribution to be destined to the final use of the consumers. Obviously some coupling operations carried out for the bottom and the lid with the aid of polyurethane adhesives, can be accomplished by the coextrusion technology.

The invention described for clarity exigency with reference to the (preferred and not limitative) embodiments shown in the accompanying drawings is susceptible of all the variations, substitutions, modifications, etc. which are in the reach of the mean skilled person and which fall therefore in the spirit and scope of the present invention.

We claim:

1. A resealable packaging system comprising flexible composite multilayer foils forming a lid which may be opened and reclosed repeatedly, said multilayer foil comprising:

an outer multilayer film including:
 a mechanically resistant layer adapted to receive printed data;
 a gas barrier layer; and
 a layer of pressure-sensitive adhesive;
a second lower inner film having a cut line giving access to a container closed by said multilayer film said lower inner film comprising:
 a mechanically resistant layer;
 a thermosealing layer; and
 a pressure-sensitive adhesive layer;
 said packaging system having;
 an open border;
 an opening stopping device;
 a protecting layer for guarding against possible undesirable effects of a product in the package;
 a tamper evident device; and
 an easy open lifting border.

2. The system according to claim 1, wherein the stopping device is formed by shaping an end of the cut line as an access mouth.

3. The system according to claim 1, wherein the protecting layer is on the inside surface of the lid and facing a content of the package, and the protecting layer ha a thickness of not over 40 microns whereby the protecting layer is breakable in correspondence with the cut line.

4. The system according to claim 1, further comprising tamper evident means comprising small thermo-weldings formed simultaneously with a sealing welding between the lid and a container body.

5. The system according to claim 1 further comprising a lifting border adjacent a tray shaping edge.

6. The system according to claim 1, wherein the opening cut line is a die-cut in the lower layer of the lid and is positioned in correspondence with a package opening.

7. The system according to claim 6 wherein the lid is easy to open in response to a separation between a pressure-sensitive adhesive layer and the die-cut layer.

8. A flexible composite foil including a multilayer film being adapted as an opening and reclosing means for a container of products to be consumed in successive does, said composite foil comprising at least:
   i) an outer multilayer film including a mechanically resistant layer being adapted to serve as a printing support, and a press-sensitive adhesive support;
   ii) an inner film having an incision or die-cut defining the configuration of a container access mouth and an opening end comprising a mechanically resistant layer; and
   iii) a press-sensitive adhesive layer disposed between the outer and the inner films, the flexible composite foil being characterized in that it comprises an opening border and a protective layer for protection against possible aggressive effects of packaged contents.

9. The flexible composite foil according to claim 8 wherein the opening border is a die-cut of the inner film, positioned in correspondence with a head welding of the container.

10. The flexible composite foil according to claim 8 wherein the protective layer is on the inferior inner portion of the multilayer film facing the products to be consumed, and has a thickness below 40 microns to be breakable in correspondence with the incision or die-cut.

11. The flexible composite foil according to claim 8 wherein easy opening is effected by separation between the press-sensitive adhesive layer and the inner film.

12. The flexible composite coil of claim 8 wherein the outer multilayer film also comprises a gas barrier layer.

13. The flexible composite foil according to claim 8 wherein the inner film also comprises a thermosealing layer.

14. The flexible composite foil according to claim 8 further comprising an easy-open lifting border.

15. The flexible composite foil according to claim 14 wherein the lifting border is defined by a tray shaping of the container.

16. The flexible composite foil according to claim 8 further comprising an opening stopping device together with a tamper-evident device.

17. The flexible composite foil according to claim 16 wherein the tamper evident device includes small thermo-weldings carried out at the same time of the sealing welding between the multilayer film and the container.

18. The flexible composite foil according to claim 16 wherein the stopping device is obtained by shaping the die-cutting of the inner film as the access mouth.

* * * * *